US012770421B2

(12) United States Patent
Geese et al.

(10) Patent No.: US 12,770,421 B2
(45) Date of Patent: Oct. 20, 2026

(54) OPTICAL CHARACTER RECOGNITION (OCR) ENHANCEMENT VIA INERTIAL MEASUREMENT UNIT (IMU)-SUPPORTED SUPER-RESOLUTION IMAGING

(71) Applicant: Apple Inc., Cupertino, CA (US)

(72) Inventors: Marc Geese, Illertissen (DE); Thomas G. Salter, San Francisco, CA (US); Ryan J. Dunn, Santa Cruz, CA (US); Peter Burgner, Venice, CA (US); Lionel E. Edwin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 18/884,605

(22) Filed: Sep. 13, 2024

(65) Prior Publication Data

US 2025/0104456 A1 Mar. 27, 2025

Related U.S. Application Data

(60) Provisional application No. 63/584,342, filed on Sep. 21, 2023.

(51) Int. Cl.
*G06V 10/00* (2022.01)
*G06T 3/4053* (2024.01)
(Continued)

(52) U.S. Cl.
CPC ............ *G06V 30/10* (2022.01); *G06T 3/4053* (2013.01); *G06T 5/50* (2013.01); *G06T 7/20* (2013.01);
(Continued)

(58) Field of Classification Search
CPC ........ G06V 10/25; G06V 10/82; G06V 10/85; G06V 10/761; G06V 10/762;
(Continued)

(56) References Cited

U.S. PATENT DOCUMENTS 9,230,157 B2 * 1/2016 Bataller .................. G06F 18/22
9,317,764 B2 * 4/2016 Baheti .................... G06V 20/63
(Continued)

OTHER PUBLICATIONS

Wang Hsueh-Cheng et al: “Spatially Prioritized and Persistent Text Detection and Decoding”, Mar. 19, 2014 (Mar. 19, 2014), Advances in Visual Computing : 16th International Symposium, ISVC 2021, Virtual Event, Oct. 4-6, 2021, Proceedings, Part II; [Lecture Notes in Computer Science], Springer International Publishing, Cham, pp. 3-17, XP047651851, ISSN: 0302-9743 ISBN: 978-3-030-90436-4 [retrieved on Mar. 19, 2014].

*Primary Examiner* — Amir Alavi
(74) *Attorney, Agent, or Firm* — Blank Rome LLP

(57) ABSTRACT

Electronic devices, methods, and program storage devices for achieving improved optical character recognition (OCR) operations are disclosed. Performing OCR operations on captured images, e.g., images captured by cameras that are affixed to a user’s body (e.g., from mixed reality devices, such as smart HMDs) requires a low-power, robust camera design. Obtaining high spatial resolution in such captured images faces many challenges. However, images with higher spatial resolution can be created by combining information extracted from multiple images captured by such devices, leveraging information obtained from positional sensors of such devices, and performing SR post-processing operations. Such higher spatial resolution images may then be used to enable high-acuity OCR capabilities. The solutions disclosed herein also compensate for the missing ability of such devices due to the lack of a vestibulo-ocular reflex (i.e., the human visual system’s ability to use compensating eye movement to fixate and read text clearly, despite head movement).

20 Claims, 4 Drawing Sheets

(51) Int. Cl.
*G06T 5/50* (2006.01)
*G06T 7/20* (2017.01)
*G06V 10/25* (2022.01)
*G06V 30/10* (2022.01)

(52) U.S. Cl.
CPC .... *G06V 10/25* (2022.01); *G06T 2207/20132* (2013.01); *G06T 2207/20221* (2013.01); *G06T 2207/30168* (2013.01)

(58) Field of Classification Search
CPC ............... G06V 10/764; G06V 10/765; G06V 10/7715; G06V 10/806; G06V 20/20; G06V 20/63; G06V 30/10; G06V 30/142; G06T 7/20; G06T 3/4053; G06T 5/50; G06T 2207/20132; G06T 2207/20221; G06T 2207/30168
See application file for complete search history.

(56) References Cited

U.S. PATENT DOCUMENTS

| | | | | |
|---|---|---|---|---|
| 9,965,677 | B2 * | 5/2018 | Bulan | G06V 20/52 |
| 10,212,408 | B1 * | 2/2019 | Pappas-Katsiafas | H04N 13/156 |
| 10,535,160 | B2 * | 1/2020 | Kellogg | G06V 10/25 |
| 11,308,634 | B2 * | 4/2022 | Alessandrini | G06T 7/33 |
| 11,386,636 | B2 * | 7/2022 | Goncalves | G06F 18/22 |
| 2015/0350617 | A1 * | 12/2015 | Chevassus | H04N 9/3191 348/745 |
| 2019/0043236 | A1 | 2/2019 | Jones | |
| 2019/0311209 | A1 | 10/2019 | Ducote | |
| 2025/0104456 | A1 * | 3/2025 | Geese | G06V 20/20 |

* cited by examiner

OPTICAL CHARACTER RECOGNITION (OCR) ENHANCEMENT VIA INERTIAL MEASUREMENT UNIT (IMU)-SUPPORTED SUPER-RESOLUTION IMAGING

TECHNICAL FIELD

This disclosure relates generally to the field of digital image processing. More particularly, but not by way of limitation, it relates to techniques for performing enhanced optical character recognition (OCR) in captured images.

BACKGROUND

The advent of portable integrated computing devices has caused a wide-spread proliferation of digital cameras. These integrated computing devices commonly take the form of smartphones or tablets and typically include general purpose computers, cameras, sophisticated user interfaces including touch-sensitive screens, and wireless communications abilities through Wi-Fi, Long Term Evolution (LTE), New Radio (NR), and other cell-based or wireless technologies. The wide proliferation of these integrated devices provides opportunities to use the devices' capabilities to perform tasks that would otherwise require dedicated hardware and software. For example, as noted above, integrated devices such as smartphones and tablets typically have two or more embedded cameras. These cameras comprise lens/camera hardware modules that may be controlled through the general-purpose computer using system software and/or downloadable software (e.g., "Apps") and a user interface including, e.g., programmable buttons placed on a touch-sensitive screen, physical buttons, gesture recognition, and/or "hands-free" controls, such as voice controls.

One opportunity for using the features of an integrated device is to capture and evaluate images. The devices' camera(s) allow for the capture of video image streams comprising one or more images, and the general-purpose computer provides processing power to perform analysis on the captured images. In some cases, analysis of the captured images can be facilitated by transmitting the image data or other data to a service computer (e.g., a server, a website, or other network-accessible computer) using the communications capabilities of the device.

These abilities of integrated devices allow for recreational, commercial, and transactional uses of images and image analysis. For example, images may be captured and analyzed to recognize and decipher information from the images, such as characters, symbols, and/or other information appearing on objects of interest that are present in the captured images. This process of deciphering information from characters, symbols, and/or other information in captured images is also referred to herein as optical character recognition, or "OCR."

The characters, symbols, and/or other information deciphered from the objects of interest in the captured images may be transmitted over a network for any useful purpose, such as for use in a game, reading/translation of text, storing information into a database, or as part of a transaction, such as a credit card transaction. For these reasons and others, it is useful to enhance the abilities of these integrated devices and other devices for deciphering information from captured images in a wide array of scenes and environmental conditions.

In particular, when trying to perform OCR on images captured by cameras that are affixed to a user's head (e.g., head-mounted display (HMD) devices) or that are affixed to another part of a user's body (e.g., wearable devices), there are multiple challenges that such devices may face in performing OCR. Because of the widely-varying distances that the objects of interest may be from the capturing camera when the user's device is attempting to recognize the characters appearing on the object of interest, one particular challenge is the difficulty in focusing the camera properly on the characters so that they appear sharp. Another challenge faced is associated with the difficulties in reading characters that will need perspective correction, e.g., if the object of interest is not positioned in a plane parallel to the capturing camera. Additional challenges include the fact that most cameras in HMDs or other wearable devices are typically small form factor, require low power consumption, have a large f-number (e.g., f>2.0), and are affixed to the user—meaning that user motion is not compensated for, which can result in motion blurring in any captured images. Finally, the scenes in which such OCR operations are performed may often be low-light scenes (e.g., indoors, restaurants, home office environments, etc.) that include movement of the user and/or the object of interest. These factors can combine to result in the capture of noisy, low spatial resolution, and motion-blurred images, each of which are sub-optimal image characteristics for performing OCR operations.

The inventors have realized new and non-obvious ways to make it easier for a camera integrated into a user device to detect and recognize characters on objects of interest in captured scenes, e.g., by leveraging information obtained from positional sensors embedded in such devices, as well as performing super-resolution (SR) image post-processing techniques, to overcome one or more of the aforementioned challenges.

SUMMARY

Performing OCR operations on captured images, e.g., images that are captured by cameras that are affixed to a user's body (e.g., from mixed reality (MR) devices, such as HMDs, or other augmented reality (AR) devices) requires a low-power, robust camera design. Obtaining high spatial resolution of the geometry of the objects of interest in such captured images also faces additional challenges, such as: (1) the optical and power consumption limitations in the camera module's design; (2) addressing uncompensated camera movements during image capture, e.g., due to movements of the user's head or body; and (3) movement of the object of interest in the scene with the characters appearing on it that are to be OCR'd, e.g., due to the object moving and/or the movement of the user who is holding the object while it is being captured.

However, images with higher spatial resolution may be created by using the combination of: the images captured by such small form factor/low-power camera modules; one or more positional sensors (e.g., Inertial Measurement Units (IMUs)); and image super-resolution (SR) post-processing operations. Such created higher spatial resolution images (also referred to herein as "super-resolution" or "SR" images, due to their having a resolution that is greater than the resolutions of any of the constituent images that were used to form them) may then be used to enable high-acuity OCR capabilities, i.e., despite the various camera module constraints and limitations often faced in user devices, such as HMDs and other wearables.

The solutions disclosed herein also compensate for the missing ability of such user devices due to the lack of a vestibulo-ocular reflex (i.e., the human visual system (HVS)

's ability to use compensating eye movement to fixate and read text clearly, despite rapid head movement), as in present in human vision.

To this end, various electronic device embodiments are disclosed herein. Such electronic devices may include: a memory; a positional sensor, such as an inertial measurement unit (IMU); a first image capture device with various optical characteristics, e.g., having a first field view of view (FOV), a first f-number, a depth of field (DoF), particular chromatic aberrations, etc.; and one or more processors operatively coupled to the memory. According to one embodiment, instructions may be stored in the memory, the instructions, when executed, causing the one or more processors to: obtain a first video image stream from the first image capture device, wherein the first video image stream comprises a first plurality of captured images; obtain a first positional information data stream from the IMU, wherein the first positional information data stream comprises data indicative of a position of the device during the capture of the first plurality of captured images; identify a location of a region of interest (ROI) in a first image of the first plurality of captured images, wherein the ROI includes textual information; track the location of the ROI in a second image of the first plurality of captured images, based, at least in part, on the data from the first positional information data stream indicative of the position of the device during the capture of the second image, wherein the second image is captured after the first image; reconstruct a super-resolution (SR) version of the ROI based, at least in part, on aligning and fusing the ROI in the first image with the ROI in the second image; and perform optical character recognition (OCR) on the textual information in the reconstructed SR version of the ROI.

In some embodiments, the ROI comprises a cropped region from a respective image the first plurality of captured images. As may be understood, additional processing and/or power efficiencies may be gained if the ROI is tightly cropped around the text in the image that is to be OCR'd and other image pixels are discarded. For example, in some implementations, additional efficiencies may be gained by only running the image capture device and/or various of its signal processing operations (e.g., an analog-to-digital conversion process) on the ROI that is intended to be used in the SR reconstruction process.

According to another embodiment, the one or more processors may be further configured to execute instructions causing the one or more processors to: receive a first request from a user to initiate performance of an OCR operation on the first video image stream.

According to another embodiment, the one or more processors may be further configured to execute instructions causing the one or more processors to: track the location of the ROI in a number, n, of additional images of the first plurality of captured images, based, at least in part, on the data from the first positional information data stream indicative of the position of the device during the capture of the n additional images, wherein reconstructing the SR version of the ROI is further based, at least in part, on aligning and fusing the ROI in the first image and the ROI in the second image with the ROI in each of the n additional images. In some implementations, the number, n, of additional images may comprise a predetermined maximum number, while, in other implementations, the number, n, of additional images may be determined based, at least in part, on one or more of: a desired contrast level for the SR version of the ROI; a desired signal-to-noise ratio (SNR) for the SR version of the ROI; a desired resolution for the SR version of the ROI; a type of object that is represented within the OCR; or a desired quality indicator for the SR version of the ROI.

According to another embodiment, the one or more processors may be further configured to execute instructions causing the one or more processors to: discard at least one image from the first video image stream based, at least in part, on: (a) the data from the first positional information data stream indicative of the position of the device during the capture of the at least one image exceeding a motion threshold value or (b) a quality criterion not being met for the at least one image. For example, the quality criterion may be related to one or more of: a degree to which an ROI covers an object of interest in a given image; an SNR level for a given image (which may be negatively affected by various environmental factors, e.g., ambient lux level, flickering light sources, etc.); or the settings of an Auto Exposure (AE) system of the image capture device during the capture of a given image.

According to some embodiments, e.g., in order to achieve even greater power efficiencies, obtaining the first positional information data stream from the IMU may only be initiated after the identification of the location of the ROI in a first image.

According to other embodiments, reconstructing the SR version of the ROI may comprise upscaling at least one of: the ROI in the first image; or the ROI in the second image.

According to still other embodiments, a neural network (NN) or other AI-based model may be utilized to identify the location of the ROI in the first image.

According to yet other embodiments, performing OCR on the textual information in the reconstructed SR version of the ROI may further comprise transmitting the reconstructed SR version of the ROI to another device, wherein the another device performs, at least in part, an OCR operation on the textual information in the reconstructed SR version of the ROI and receiving results of the performance of the OCR operation by the another device.

Various methods of performing enhanced OCR operations are also disclosed herein, in accordance with the various electronic device embodiments enumerated above. Non-transitory program storage devices are also disclosed herein, which non-transitory program storage devices may store instructions for causing one or more processors to perform operations in accordance with the various electronic device and method embodiments enumerated above.

DETAILED DESCRIPTION

In the following description, for purposes of explanation, numerous specific details are set forth in order to provide a thorough understanding of the inventions disclosed herein. It will be apparent, however, to one skilled in the art, that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and it may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Challenges with Performing OCR on HMDs and Other Wearable Devices

Figure 1:
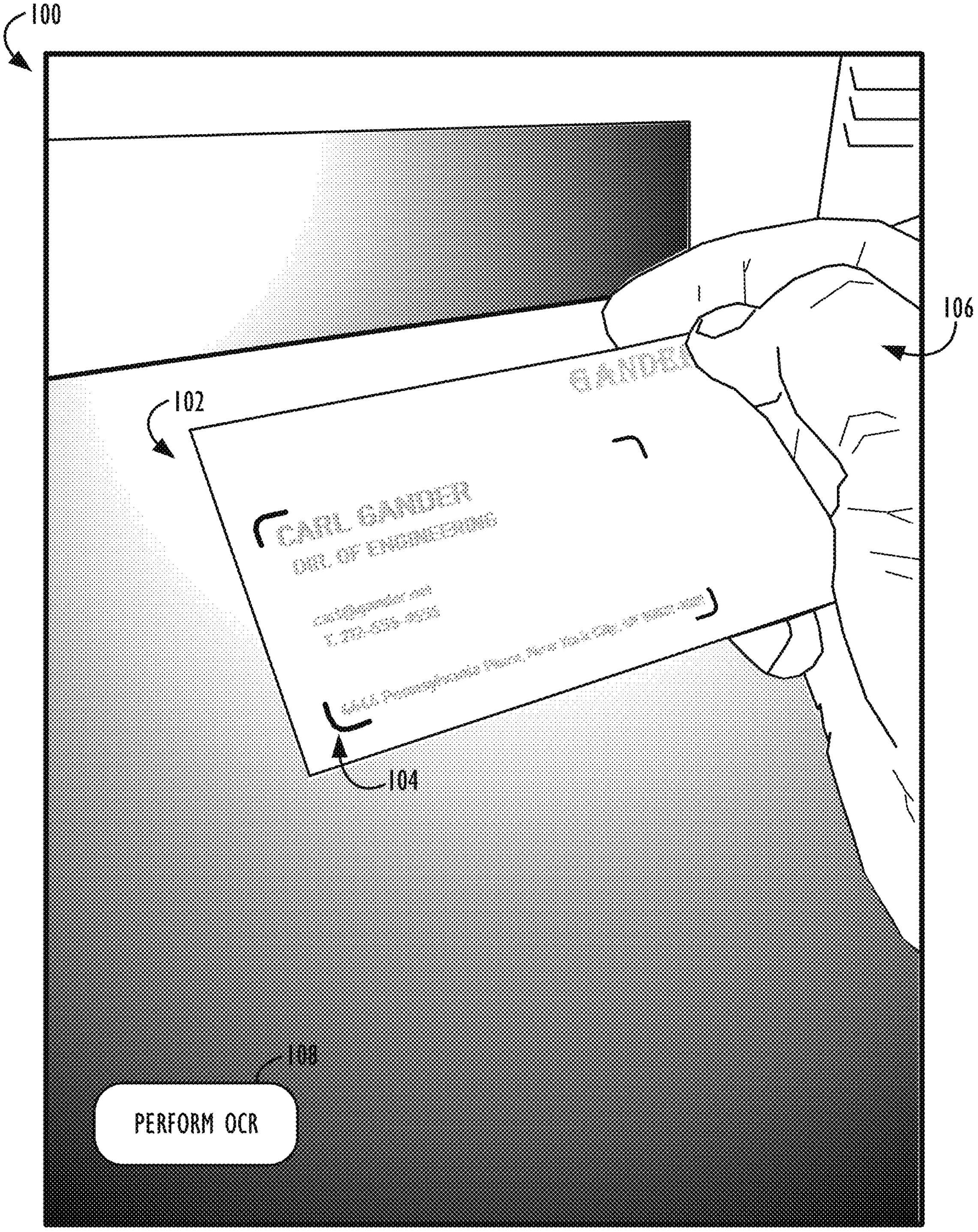
FIG. 1 illustrates an exemplary captured image from a video image stream, upon which optical character recognition (OCR) is to be performed, according to one or more embodiments.

Referring now to FIG. 1, an exemplary captured image 100 from a video image stream, upon which optical character recognition (OCR) is to be performed, is illustrated, according to one or more embodiments. Exemplary image 100 includes an object of interest (e.g., in this case, business card 102), which is being held by a human hand 106. Region of interest (ROI) indicator 104 indicates a region within the object of interest wherein textual information (or other symbols) have been detected (or are predicted to be located) and thus have been identified as being regions of the captured image in which the user may want to perform an OCR operation (e.g., as indicated by user interface element 108, which may be activated by a user via any suitable user interface modality, such as touch, gesture recognition, verbal command, selection with a pointing device, etc.).

In some embodiments, specific heuristics may be employed to detect specific types of objects of interest within the images of a captured video image stream that may be likely to have textual information of interest to a user (e.g., business cards, menus, books, etc.), which heuristics may be based, e.g., on typical sizes, typical shapes, typical dimensions, typical colors, etc., of such objects.

In other embodiments, specific types of objects of interest (e.g., objects that may include text that a user may desire to perform OCR operations on) may be identified within a captured image(s) using artificial intelligence (AI) and/or machine learning (ML)-based models or other detectors. In some embodiments, such heuristics and/or models may also be used to estimate which portion(s) of the object of interest include text, upon which more processing-intensive OCR operations may be performed (e.g., as illustrated by indicator 104 on business card 102 in FIG. 1).

In some embodiments, a goal of the improved devices disclosed herein is to provide a user-worn image capture device (e.g., HMDs) with improved visual acuity, e.g., "20/20 vision" capabilities, i.e., the device should be able to successfully perform OCR on any captured text that a human user wearing the device would also be able to read with their own eyes. In some embodiments, the improved devices may even have vision/OCR capabilities that exceed the capabilities of a human being. This level of high-acuity OCR can prevent the scenario from occurring, wherein a user can read the text on an object in front of them (i.e., in their field of view) with their own eyes, but the camera on their device cannot capture images with a high enough quality level to be able to successfully perform OCR on the same text.

In the case of user-worn image capture devices, e.g., HMDs, the user's head is nearly always moving at least a small amount while the device is capturing images, which creates some amount of motion blurring in any captured images. This issue can be exacerbated further in low-lighting environments, wherein camera exposure times tend to be even longer (i.e., as compared to camera exposure times in well-lit environments). The effect of this motion blurring makes it even more difficult (and may even make it impossible) to reliably recognize very small characters (e.g., characters that are less than approximately 1.5 mm in height) in single images captured by such camera module.

Referring back to FIG. 1, a human user may be able to discern the zip code of "10001-1001" on the bottom line of business card 102 with their eyes, but, due to the various image capturing condition complications detailed above, running a typical OCR algorithm over the ROI indicated by indicator 104 from a single image such as image 100 may fail to reliably recognize the zip code, e.g., because of the image being too noisy and/or too blurry, combined with the text size being quite small (i.e., being low resolution).

Thus, according to the various embodiments that will now be described herein, an intermediary "super-resolution (SR)" image asset may be constructed from two or more representations of the ROI indicated by indicator 104 captured over time. In some such embodiments, the tracking of the ROI region over the capture of a number, n, of subsequently captured images may be aided by the use of a positional sensor, e.g., an IMU, embedded in the user worn device. Such a positional sensor may be configured to output a contemporaneous positional information data stream indicative of the position and/or movement of the camera device during the capture of the subsequent images.

For example, if a user's head moved an equivalent of 50 pixels of distance to the right between the capture of a first image and a second image, an initial estimation of the location of the ROI within the second image may be seeded at a location that is 50 pixels to the right of the location of the ROI within the first image (subject to any further modifications to the ROI's location in the second image, e.g., as suggested by any other heuristics and/or models being used to track the ROI's location and/or actual movement of the object of interest/ROI within the scene between the capture of the first image and the second image).

According to some embodiments, the IMU data may be used to predict the location of the ROI into the next captured image frame, e.g., adding an additional border margin to cover the uncertain nature of the prediction process. The prediction can then be updated and refined for the next captured image frame, e.g., based on corrections drawn from analysis of captured image (e.g., whether there has been a successful capture of the full ROI, whether an object has been missed, such as would be the situation if the full representation of business card 102 from FIG. 1 was no longer appearing in the ROI). ROI tracking modes that use an IMU alone (as well as NN-supported tracking modes) are also possible, depending on the particular operating conditions and use cases involved.

IMU-Supported Image Reconstruction

Figure 2:
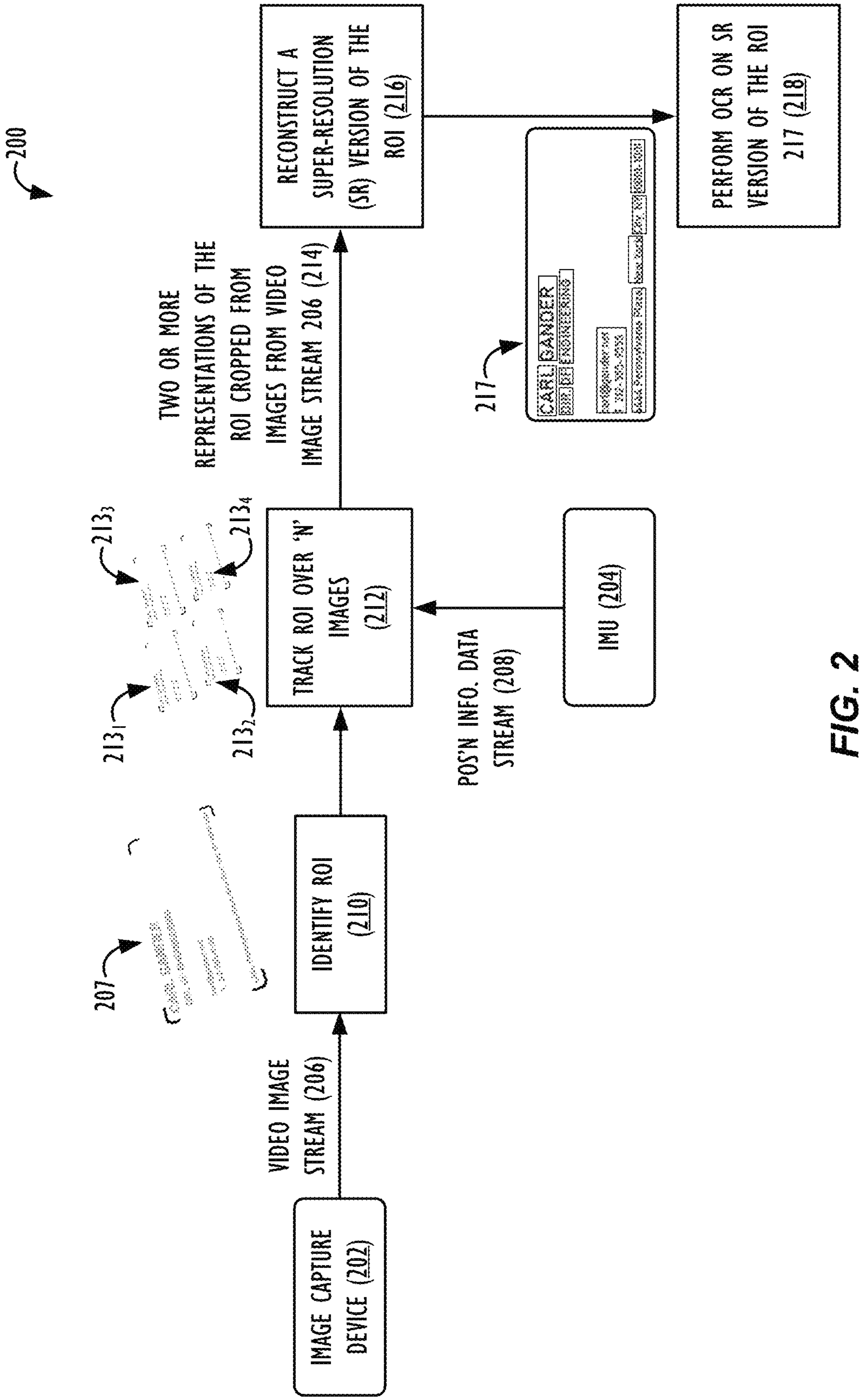
FIG. 2 illustrates an exemplary Inertial Measurement Unit (IMU)-supported image reconstruction system, according to one or more embodiments.

Referring now to FIG. 2, a block diagram 200 is shown, illustrating an exemplary IMU-supported image reconstruction system, according to one or more embodiments. As described above, an image capture device 202 may be used to obtain a video image stream 206, e.g., a stream of images captured at a rate of 30 frames per second (fps), or 60 fps, or 120 fps, etc.

Within each captured image, one or more heuristics, detectors, neural networks, AI-based models (e.g., large language models (LLMs), and/or other types of algorithms may be run on the captured image to attempt to identify an ROI at block 210. As described above, an ROI may comprise a region of text that is detected: anywhere in a captured scene, within a certain depth range of a captured scene, on the surface of an object of interest or a type of object of interest, any text having a certain minimum height in the captured scene, etc. Exemplary ROI 207 represents an exemplary ROI that has been extracted (e.g., cropped) from image 100 of FIG. 1. As may be appreciated, an ROI may need to be shifted, rotated, scaled, perspective-corrected, etc., before OCR operations are applied on it, e.g., based on how the object of interest (i.e., the object of which the ROI is a part) is oriented within the captured scene.

Next, at block 212, the ROI may be tracked over a number, n, of additional, i.e., subsequently-captured, images, as illustrated by exemplary ROI representations $213_1$-$213_4$. As mentioned above, in some embodiments, the tracking of the ROI over the subsequently-captured image frames may be aided by a positional information data stream 208 that is output by a positional sensor, e.g. IMU 204. In some implementations, to conserve additional power, it may be desirable to wait to power on IMU 204 until a valid ROI has been located and needs to be tracked. It is to be understood that, although not illustrated in FIG. 2, in some implementations, the device may have sufficient processing power/thermal budget that more than one ROI, e.g., each containing different sets of textual information, may be tracked (and reconstructed for enhanced OCR purposes) by the device in parallel tracking operations.

At step 214, two or more representations of the ROI cropped from images from video image stream 206 (e.g., ROI representation $213_1$, $213_2$, and $213_4$) may be used in block 216 in the reconstruction of a super-resolution (SR) version of the ROI. As may be understood, in some implementations, data from the positional information data stream 208 may also be used to reject certain images (e.g., ROI representation $213_3$) from inclusion in the SR image reconstruction operations of block 216, e.g., because the positional information associated with such images indicated an amount of image capture device rotation/movement that would be indicative of high likelihood of more than a threshold amount of motion blurring, making such images unhelpful in OCR operations.

The SR image reconstruction operations of block 216 may, e.g., include aligning and fusing the ROI in the first image (207) with the ROI in each of the n additional images (e.g., $213_N$). In some implementations, the reconstruction operation may involve first aligning the images (e.g., shifting, rotating, distortion correction, etc.) and then superimposing (e.g., fusing) the ROIs to produce an enhanced SR version of the ROI (i.e., an ROI having a resolution greater than the resolution of the ROI as extracted from any of the constituent additional images). As may now be understood, capturing the ROI from different angles and/or sub-pixel positions across the n additional images can allow the system accumulate additional image detail, such that the constituent images may be overlapped to create a reconstructed version of the ROI with higher quality (e.g., less noise, less motion blurring, etc.), which, in turn, would serve as a better input to any subsequent OCR operations.

Reconstructed SR image 217 illustrates an exemplary result of a reconstructed SR version of the ROI from business card 102 in FIG. 1. As illustrated, the text from the business card is less noisy, less blurry, and distortion-corrected, such that, at block 218, OCR operations are able to be successfully performed on all the text within ROI 104, i.e., all of the text on the front of business card 102 in FIG. 1.

According to other examples, other AI-based solutions and tasks could directly use and/or indirectly benefit from enhanced IMU support. For example, reconstructing super-resolution versions of images (or portions of images) can be performed with or without OCR serving as the ultimate task performed by a device or system. For example, other AI-based tasks, such as object recognition, scene/activity classification, etc., may likewise benefit from the reconstruction of SR versions of captured images, wherein relevant scene portions are represented with better detail and with greater clarity in such reconstructed SR versions.

Similarly, the SR and OCR tasks themselves can each be solved with classic Machine Vision techniques and/or with AI/NN-based techniques, e.g., pre-trained neural networks or variants of pre-trained neural networks adapted specifically for different situations to help conduct SR and/or OCR tasks.

Exemplary OCR Operations Leveraging IMU-Supported Super-Resolution (SR) Imaging

Figure 3:
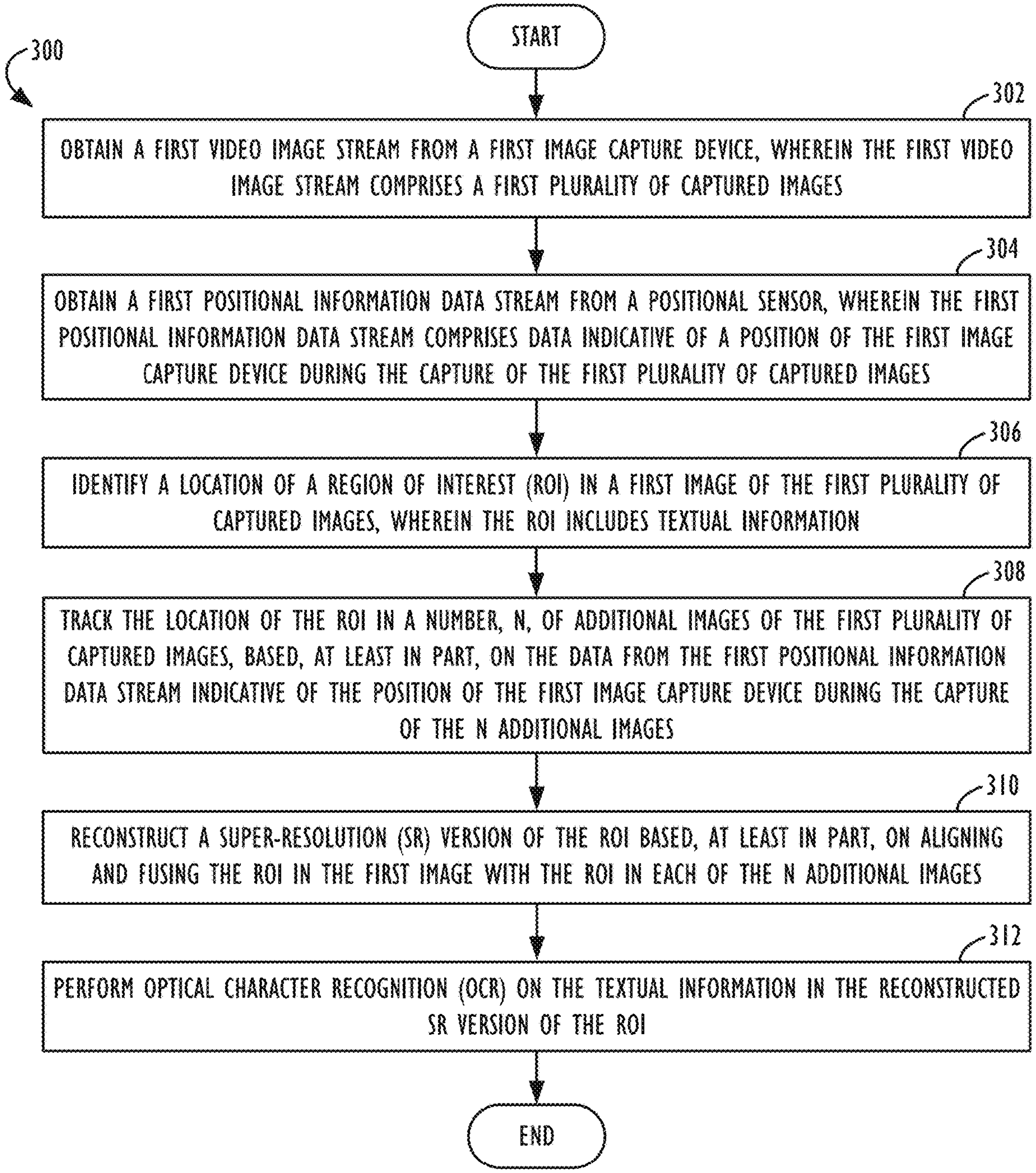
FIG. 3 is a flow chart illustrating a method of performing OCR operations leveraging IMU-supported super-resolution (SR) imaging, according to one or more embodiments.

Referring now to FIG. 3, a flow chart is shown, illustrating a method 300 of performing OCR operations leveraging IMU-supported super-resolution (SR) imaging, according to one or more embodiments. The method 300 may begin at Step 302 by obtaining a first video image stream from a first image capture device, wherein the first video image stream comprises a first plurality of captured images. Next, at Step 304, the method 300 may continue by obtain a first positional information data stream from a positional sensor, e.g., an Inertial Measurement Unit (IMU), accelerometer, gyroscope, or the like, wherein the first positional information data stream comprises data indicative of a position of the first image capture device during the capture of the first plurality of captured images. As mentioned above, in some embodiments, to save additional power, the IMU may not be turned on until a first valid ROI is identified in a captured image.

In some embodiments, the method 300 itself may not be initiated unless or until it is determined that a SR reconstruction process may be helpful (e.g., if the relevant detected text is less than a threshold average height, if the scene lux is below a threshold brightness level, if the device movement is above a motion threshold, etc.). If the IMU-supported SR reconstruction process is not deemed helpful or necessary, then a more traditional, e.g., single-image, OCR operation may be applied to a captured image. Alternatively, if the scene conditions are sufficiently poor (e.g., extremely low lux, extremely high noise, an inability to resolve low spatial frequency details in the captured images, etc.), then neither traditional OCR processes nor IMU-supported SR reconstruction OCR processes (such as those described herein) may be attempted—until the scene conditions have improved sufficiently.

Next, at Step 306, the method 300 may identify a location of a region of interest (ROI) in a first image of the first plurality of captured images, wherein the ROI includes textual information. In some low-light environments, if available, a flash or other form of illumination may be applied by the image capture device during the capture of the images in the video image stream, i.e., to aid in the location of the ROI within the captured scene.

At Step 308, the method 300 may continue by tracking the location of the ROI in a number, n, of additional images of the first plurality of captured images, based, at least in part, on the data from the first positional information data stream indicative of the position of the first image capture device during the capture of the n additional images. As described above, various parameters or settings may be considered when determining how many additional images to gather for the image reconstruction operation, e.g., the number, n, of additional images may be determined based, at least in part, on one or more of: a desired contrast level for the SR version of the ROI; a desired signal-to-noise ratio (SNR) for the SR version of the ROI (e.g., ROIs from images may continue to be acquired and fused with the existing fused ROI image, until a desired SNR threshold is met in the fused image); a desired resolution for the SR version of the ROI (e.g., a resolution multiplier factor relative to the resolution of the ROI in the originally-captured images); a type of object that is represented within the OCR; or a desired quality indicator for the SR version of the ROI. Moreover, one or more of the additional images may be discarded (i.e., not used in the reconstruction operations of Step 310), based, at least in part, on: (a) the data from the first positional information data stream indicative of the position of the device during the capture of the at least one image exceeding a motion threshold value (i.e., indicating that the image is likely too blurry to be useful) or (b) a quality criterion not being met for the at least one image (e.g., such as the ROI having a poor SNR).

Next, at Step 310, the method 300 may reconstruct a super-resolution (SR) version of the ROI based, at least in part, on aligning and fusing the ROI in the first image with the ROI in each of the n additional images. In some implementations, the reconstruction operation may involve first aligning the images (e.g., shifting, rotating, distortion correction, etc.) by matching low spatial frequency features within corresponding portions of the ROIs. Once aligned, the images may be superimposed or otherwise fused to produce the enhanced super-resolution version of the ROI (i.e., an ROI having a resolution greater than the resolution of the ROI as extracted from any of the constituent first, second, or n additional images).

According to some embodiments, the first image and n additional images may be fused according to the following process. First, for each image, various per-pixel low pass filters may be estimated (e.g., a pixel point spread function (PSF), an optics PSF (e.g., including depth estimates from distortion), a motion blur estimate, etc.) to generate pixel information. Then, a model of the object of interest (i.e., the object on which the SR operations are to be performed, e.g., a planar surface for most objects having text on their surfaces) may be formed. Next, the generated pixel information (e.g., the PSFs, motion blur estimate, etc.) may be reprojected onto the object of interest model. According to some such embodiments, this reprojection operation may include an accurate and positionally-aware placement of the generated pixel information onto the object of interest in accordance with whatever the SR goal is for the current implementation (e.g., if it is desired to have 2× oversampling, 4× oversampling, 8× oversampling, etc., with respect to the original ROI pixel resolution). If this reprojection operation is estimated to be successful, then the pixel information will be distributed onto the object of interest model. Finally, the OCR algorithm being used by the given embodiment may determine if the goal of the SR operation has been reached—or if more images should be obtained.

In some embodiments, the reconstruction operation may be performed by a low-power dedicated ASIC or other hardware-embedded logic module. In still other embodiments, one or more parts of the reconstruction operation may be performed by another service computer, e.g., accessible via the Internet. In yet other embodiments, one or more parts of the reconstruction operation may be performed by a neural network (NN) that is pre-trained or otherwise configured to align and fuse an ROI in a first image with the ROI in each of an additional n images.

Finally, at Step 312, the method 300 may perform OCR on the textual information in the reconstructed SR version of the ROI, e.g., using any desired OCR algorithm or technique. Improved OCR performance may be achieved by operating on the reconstructed SR version of the ROI, as opposed to the lower-resolution, likely noisier and/or blurrier version of the ROI, as may have been extracted from any of the constituent first, second, or n additional images. In some embodiments, one or more parts of the OCR operation itself may be performed by a neural network (NN) that is pre-trained or otherwise configured to recognized characters in image data.

Exemplary Electronic Computing Devices

Figure 4:
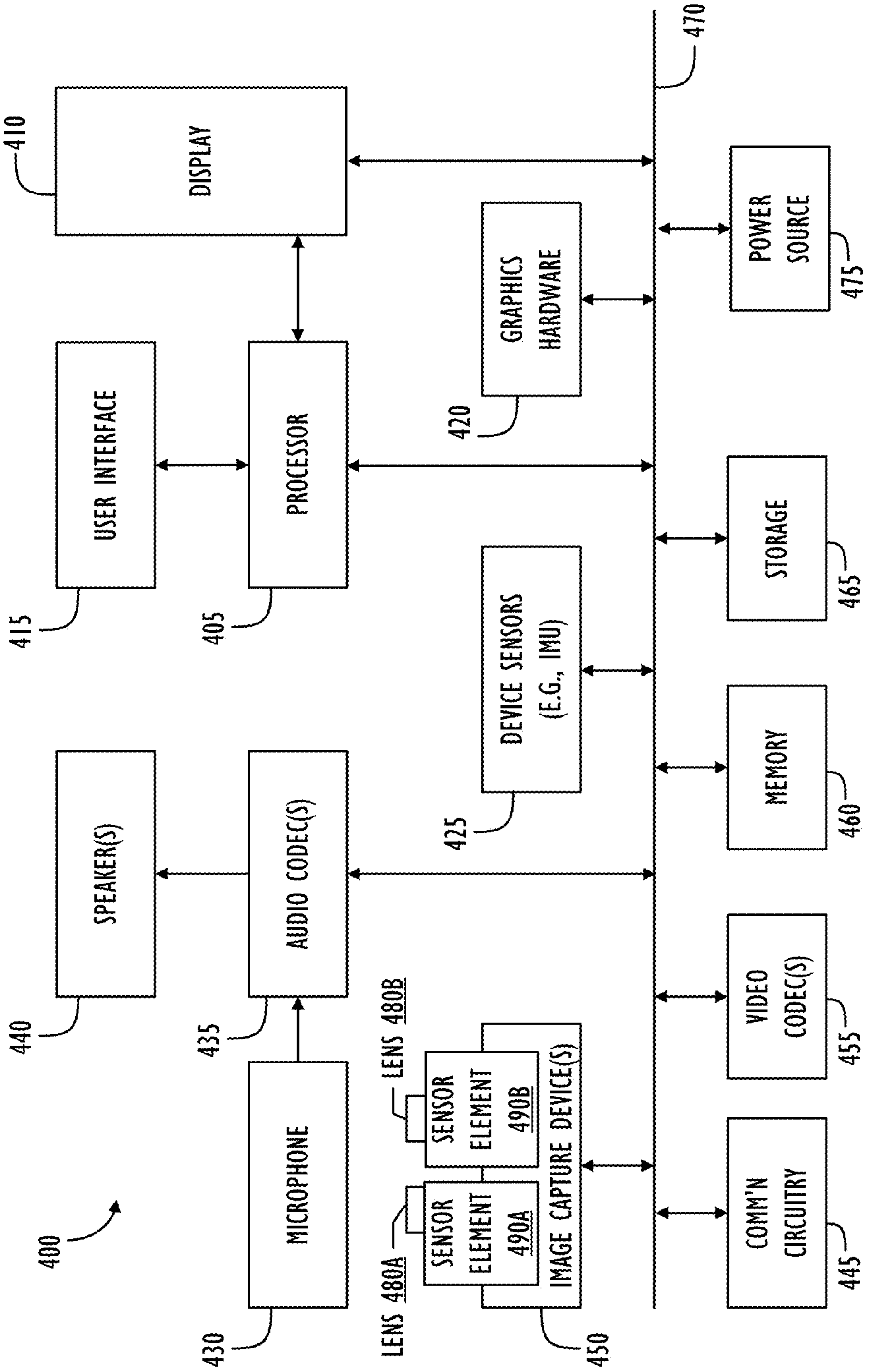
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, an HMD, a wearable, a portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer, inertial measurement unit (IMU), and/or gyroscope), microphone 430, audio codec(s) 435, speaker(s) 440, communications circuitry 445, image capture device(s) 450, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular image frame(s) that the user would like to capture (e.g., by clicking on a physical or virtual button at the moment the desired image frame is being displayed on the device's display screen).

In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip (SOC) such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU.

Image capture device(s) 450 may comprise one or more camera units configured to capture images, e.g., images which may be processed to help further calibrate said image capture device in field use, e.g., in accordance with this disclosure. Image capture device(s) 450 may include two (or more) lens assemblies 480A and 480B, where each lens assembly may have a separate focal length. For example, lens assembly 480A may have a shorter focal length relative to the focal length of lens assembly 480B. Each lens assembly may have a separate associated sensor element, e.g., sensor elements 490A/490B. Alternatively, two or more lens assemblies may share a common sensor element. Image capture device(s) 450 may capture still and/or video images. Output from image capture device(s) 450 may be processed, at least in part, by video codec(s) 455 and/or processor 405 and/or graphics hardware 420, and/or a dedicated image processing unit or image signal processor incorporated within image capture device(s) 450. Images so captured may be stored in memory 460 and/or storage 465.

Memory 460 may include one or more different types of media used by processor 405, graphics hardware 420, and image capture device(s) 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), Electrically Erasable Programmable Read-Only Memory (EEPROM), and/or quantum technologies to store quantum states in raw and altered forms. Memory 460 and storage 465 may be used to retain computer program instructions or code organized into one or more modules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 400.

As described above, one aspect of the present technology is the gathering and use of data available from various sources to improve the performance of OCR operations. The present disclosure contemplates that, in some instances, this gathered data may include personal information data that uniquely identifies or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data, e.g., use of industry-standard data encryption tools, and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users may selectively block the use of, or access to, personal information data. That is, the present disclosure contemplates that hardware and/or software elements can be provided to prevent or block access to such personal information data. For example, in the case of improved OCR services, the present technology can be configured to allow users to select to "opt in" or "opt out" of participation in the collection of personal information data during performance of the services or anytime thereafter. In another example, users can select not to provide their content and other personal information data for improved content-related suggestion services. In yet another example, users can select to limit the length of time their personal information data is maintained by a third party, limit the length of time into the past from which content-related suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way so as to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers the potential use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, all captured image content can be processed and analyzed on-device without the need to send any personal information data off-device for further processing.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:

a memory;

a positional sensor;

a first image capture device; and one or more processors operatively coupled to the memory, wherein the one or more processors are configured to execute instructions causing the one or more processors to:

obtain a first video image stream from the first image capture device, wherein the first video image stream comprises a first plurality of captured images;

obtain a first positional information data stream from the positional sensor, wherein the first positional information data stream comprises data indicative of a position of the device during the capture of the first plurality of captured images;

identify a location of a region of interest (ROI) in a first image of the first plurality of captured images, wherein the ROI includes textual information;

track the location of the ROI in a second image of the first plurality of captured images, based, at least in part, on the data from the first positional information data stream indicative of the position of the device during the capture of the second image, wherein the second image is captured after the first image;

reconstruct a super-resolution (SR) version of the ROI based, at least in part, on aligning and fusing the ROI in the first image with the ROI in the second image; and perform optical character recognition (OCR) on the textual information in the reconstructed SR version of the ROI.

2. The device of claim 1, wherein the device comprises a head-mounted display (HMD) device.

3. The device of claim 1, wherein the one or more processors are further configured to execute instructions causing the one or more processors to:

receive a first request from a user to initiate performance of an OCR operation on the first video image stream.

4. The device of claim 1, wherein the one or more processors are further configured to execute instructions causing the one or more processors to:

track the location of the ROI in a number, n, of additional images of the first plurality of captured images, based, at least in part, on the data from the first positional information data stream indicative of the position of the device during the capture of the n additional images, wherein reconstructing the SR version of the ROI is further based, at least in part, on aligning and fusing the ROI in the first image and the ROI in the second image with the ROI in each of the n additional images.

5. The device of claim 4, wherein the number, n, of additional images comprises a predetermined maximum number.

6. The device of claim 4, wherein the number, n, of additional images is determined based, at least in part, on:

a desired contrast level for the SR version of the ROI;

a desired signal-to-noise ratio (SNR) for the SR version of the ROI;

a desired resolution for the SR version of the ROI;

a type of object that is represented within the first plurality of captured images; or a desired quality indicator for the SR version of the ROI.

7. The device of claim 1, wherein the one or more processors are further configured to execute instructions causing the one or more processors to:

discard at least one image from the first video image stream based, at least in part, on:

(a) the data from the first positional information data stream indicative of the position of the device during the capture of the at least one image exceeding a motion threshold value; or (b) a quality criterion not being met for the at least one image.

8. The device of claim 1, wherein the ROI comprises a cropped region from a respective image the first plurality of captured images.

9. The device of claim 1, wherein the obtaining of the first positional information data stream from the positional sensor is initiated after the identification of the location of the ROI in the first image.

10. The device of claim 1, wherein the instructions causing the one or more processors to reconstruct a SR version of the ROI further comprise instructions causing the one or more processors to:

upscale at least one of: the ROI in the first image; or the ROI in the second image.

11. The device of claim 1, wherein the instructions causing the one or more processors to identify a location of a ROI in a first image further comprise instructions causing the one or more processors to:

utilize a neural network (NN) or other AI-based model to identify the location of the ROI in the first image.

12. The device of claim 1, wherein the instructions causing the one or more processors to perform OCR on the textual information in the reconstructed SR version of the ROI further comprise instructions causing the one or more processors to:

transmit the reconstructed SR version of the ROI to another device, wherein the another device performs, at least in part, an OCR operation on the textual information in the reconstructed SR version of the ROI; and receive results of the performance of the OCR operation by the another device.

13. A non-transitory program storage device, comprising instructions stored thereon, to cause one or more processors to:

obtain a first video image stream from a first image capture device, wherein the first video image stream comprises a first plurality of captured images;

obtain a first positional information data stream from a positional sensor, wherein the first positional information data stream comprises data indicative of a position of the first image capture device during the capture of the first plurality of captured images;

identify a location of a region of interest (ROI) in a first image of the first plurality of captured images, wherein the ROI includes textual information;

track the location of the ROI in a second image of the first plurality of captured images, based, at least in part, on the data from the first positional information data stream indicative of the position of the first image capture device during the capture of the second image, wherein the second image is captured after the first image; and reconstruct a super-resolution (SR) version of the ROI based, at least in part, on aligning and fusing the ROI in the first image with the ROI in the second image.

14. The non-transitory program storage device of claim 13, further comprising instructions stored thereon, to cause the one or more processors to:

perform optical character recognition (OCR) on the textual information in the reconstructed SR version of the ROI.

15. The non-transitory program storage device of claim 13, further comprising instructions stored thereon, to cause the one or more processors to:

track the location of the ROI in a number, n, of additional images of the first plurality of captured images, based, at least in part, on the data from the first positional information data stream indicative of the position of the first image capture device during the capture of the n additional images, wherein reconstructing the SR version of the ROI is further based, at least in part, on aligning and fusing the ROI in the first image and the ROI in the second image with the ROI in each of the n additional images.

16. The non-transitory program storage device of claim 15, wherein the number, n, of additional images is determined based, at least in part, on:

a desired contrast level for the SR version of the ROI;

a desired signal-to-noise ratio (SNR) for the SR version of the ROI;

a desired resolution for the SR version of the ROI;

a type of object that is represented within the first plurality of captured images; or a desired quality indicator for the SR version of the ROI.

17. An image processing method, comprising:

obtaining a first video image stream from a first image capture device, wherein the first video image stream comprises a first plurality of captured images;

obtaining a first positional information data stream from a positional sensor, wherein the first positional information data stream comprises data indicative of a position of the first image capture device during the capture of the first plurality of captured images;

identifying a location of a region of interest (ROI) in a first image of the first plurality of captured images, wherein the ROI includes textual information;

tracking the location of the ROI in a number, n, of additional images of the first plurality of captured images, based, at least in part, on the data from the first positional information data stream indicative of the position of the first image capture device during the capture of the n additional images;

reconstructing a super-resolution (SR) version of the ROI based, at least in part, on an output of a neural network (NN) configured to align and fuse the ROI in the first image with the ROI in each of the n additional images; and performing optical character recognition (OCR) on the textual information in the reconstructed SR version of the ROI.

18. The method of claim 17, wherein the number, n, of additional images comprises a predetermined maximum number.

19. The method of claim 17, wherein the number, n, of additional images is determined based, at least in part, on:

a desired contrast level for the SR version of the ROI;

a desired signal-to-noise ratio (SNR) for the SR version of the ROI;

a desired resolution for the SR version of the ROI;

a type of object that is represented within the first plurality of captured images; or a desired quality indicator for the SR version of the ROI.

20. The method of claim 17, further comprising:

discarding at least one image from the first video image stream based, at least in part, on:

(a) the data from the first positional information data stream indicative of the position of the first image capture device during the capture of the at least one image exceeding a motion threshold value; or (b) a quality criterion not being met for the at least one image.

* * * * *